US012094636B2

(12) United States Patent
Eda et al.

(10) Patent No.: US 12,094,636 B2
(45) Date of Patent: Sep. 17, 2024

(54) COIL COMPONENT

(71) Applicant: TDK CORPORATION, Tokyo (JP)

(72) Inventors: Hokuto Eda, Tokyo (JP); Masataro Saito, Tokyo (JP); Kohei Takahashi, Tokyo (JP); Takamasa Iwasaki, Tokyo (JP); Hitoshi Ohkubo, Tokyo (JP); Masazumi Arata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 785 days.

(21) Appl. No.: 17/234,029

(22) Filed: Apr. 19, 2021

(65) Prior Publication Data

US 2021/0327637 A1 Oct. 21, 2021

(30) Foreign Application Priority Data

Apr. 20, 2020 (JP) ................................ 2020-074741

(51) Int. Cl.

| | |
|---|---|
| ***H01F 27/32*** | (2006.01) |
| ***H01F 27/255*** | (2006.01) |
| ***H01F 27/28*** | (2006.01) |
| ***H01F 27/29*** | (2006.01) |

(52) U.S. Cl.

CPC ....... *H01F 27/2804* (2013.01); *H01F 27/255* (2013.01); *H01F 27/29* (2013.01); *H01F 27/323* (2013.01); *H01F 2027/2809* (2013.01)

(58) Field of Classification Search

CPC .... H01F 27/2804; H01F 27/255; H01F 27/29; H01F 27/323; H01F 2027/2809; H01F 2017/048; H01F 17/0013; H01F 27/292; H01F 27/34; H01F 27/324

See application file for complete search history.

(56) References Cited

U.S. PATENT DOCUMENTS

| | | | | |
|---|---|---|---|---|
| 2005/0068150 | A1 | 3/2005 | Matsutani et al. | |
| 2015/0035634 | A1 | 2/2015 | Nakamura et al. | |
| 2016/0155556 | A1 | 6/2016 | Ohkubo et al. | |
| 2016/0172102 | A1* | 6/2016 | Jeong .................... | H01F 27/255 29/605 |
| 2016/0172103 | A1* | 6/2016 | Jeong .................... | H01F 27/255 29/605 |
| 2019/0066901 | A1* | 2/2019 | Jeong ...................... | H01F 17/04 |
| 2020/0098509 | A1* | 3/2020 | Kim ........................ | H01F 27/29 |
| 2022/0270813 | A1 | 8/2022 | Kim et al. | |

FOREIGN PATENT DOCUMENTS

| | | | |
|---|---|---|---|
| CN | 110942886 | A | 3/2020 |
| JP | 2015-32625 | A | 2/2015 |
| JP | 2016-103591 | A | 6/2016 |
| JP | 2016-225464 | A | 12/2016 |
| WO | 2004040597 | A1 | 5/2004 |

* cited by examiner

*Primary Examiner* — Tuyen T Nguyen
(74) *Attorney, Agent, or Firm* — Oliff PLC

(57) ABSTRACT

In an insulation layer of a coil component, a thickness of a second covering part and a third covering part located on the penetration hole side of a first covering part is thinner than that of the first covering part. A stray capacitance occurring between a flat coil pattern and external terminal electrodes is reduced by making the first covering part of the insulation layer thicker than the second covering part and the third covering part. Further, since the second covering part and the third covering part of the insulation layers are thinner than the first covering part, a magnetic volume is increased while external dimensions of the base body is maintained, and thus a high inductance is realized.

4 Claims, 8 Drawing Sheets

COIL COMPONENT

CROSS-REFERENCE TO RELATED APPLICATIONS

This application is based upon and claims the benefit of priority from Japanese Patent Application No. 2020-74741, filed on 20 Apr. 2020, the entire contents of which are incorporated herein by reference.

TECHNICAL FIELD

The present disclosure relates to a coil component.

BACKGROUND

Regarding a coil component in the related art, for example, Japanese Unexamined Patent Publication No. 2016-103591 (Patent Literature 1) discloses a coil component which includes a coil pattern that is provided on an insulation substrate, a resin wall that defines a region for forming a flat coil pattern on the insulation substrate, and a magnetic substance that integrally covers the coil pattern and the resin wall, and in which an insulation layer is interposed between a coil and the magnetic substance.

SUMMARY

The coil component having the above-described structure can be applied to a noise filter in a high frequency band of 30 MHz or more. High impedance is required to improve noise removal performance of a coil component in a high frequency band.

The inventors have found that a stray capacitance of the coil component can be reduced by thickening the insulation layer interposed between the coil and the magnetic substance, and thus it is possible to improve the impedance.

However, when the insulation layer interposed between the coil and the magnetic substance becomes thick, a magnetic volume decreases due to a volume reduction of the magnetic substance, and inductance decreases.

According to the present disclosure, a coil component capable of improving inductance while a stray capacitance is reduced is provided.

A coil component according to an aspect of the present disclosure includes a base body constituted of a magnetic substance and having a pair of end surfaces parallel to each other; an insulation substrate configured to extend in a facing direction of the pair of end surfaces and having a penetration hole; a first coil including a flat coil pattern formed around the penetration hole in one surface of the insulation substrate in the base body, resin walls provided on one surface of the insulation substrate and located between lines of the flat coil pattern and on an inner circumference and an outer circumference of the flat coil pattern, and a drawing wiring pattern configured to draw out the flat coil pattern to one of the pair of end surfaces; a second coil including a flat coil pattern formed around the penetration hole in the other surface of the insulation substrate in the base body and configured to allow conduction with respect to the flat coil pattern of the first coil via a through-hole conductor passing through the insulation substrate, resin walls provided on one surface of the insulation substrate and located between lines of the flat coil pattern and on an inner circumference and an outer circumference of the flat coil pattern, and a drawing wiring pattern configured to draw out the flat coil pattern to the other of the pair of end surfaces; a pair of insulation layers configured to cover surfaces of the first coil and the second coil in the base body respectively; and a pair of external terminal electrodes configured to cover the pair of end surfaces and respectively connected to the drawing wiring patterns of the first coil and the second coil, wherein the insulation layer has a first part and a second part located closer to the penetration hole than the first part is, and a thickness of the second part is thinner than that of the first part.

In the coil component, a stray capacitance occurred between the flat coil pattern and the external terminal electrode can be reduced by making the first part of the insulation layer thicker than the second part. Moreover, since the second part is thinner than the first part, a magnetic volume of the base body can be increased, and an inductance can be improved.

In another type of coil component, the thickness of the insulation layer may gradually decrease toward the penetration hole side.

In another type of coil component, a height of the drawing wiring pattern may be lower than a height of the flat coil pattern with respect to the surface of the substrate.

In another type of coil component, a region of one surface of the insulation substrate corresponding to a region for forming the drawing wiring pattern of the second coil formed on the other surface of the insulation substrate may be covered with a material having a relative dielectric constant lower than that of the magnetic substance constituting the base body.

In another type of coil component, the base body may have a mounting surface parallel to the insulation substrate and located on the other surface side of the insulation substrate, the external terminal electrodes may continuously cover the end surfaces and the mounting surface of the base body, and the thickness of the insulation layer covering the second coil may be thicker than that of the insulation layer covering the first coil.

DETAILED DESCRIPTION

Hereinafter, an embodiment of the present disclosure will be described in detail with reference to the accompanying drawings. In the description, the same reference signs are used for the same elements or elements having the same function, and duplicate description will be omitted.

Figure 1:
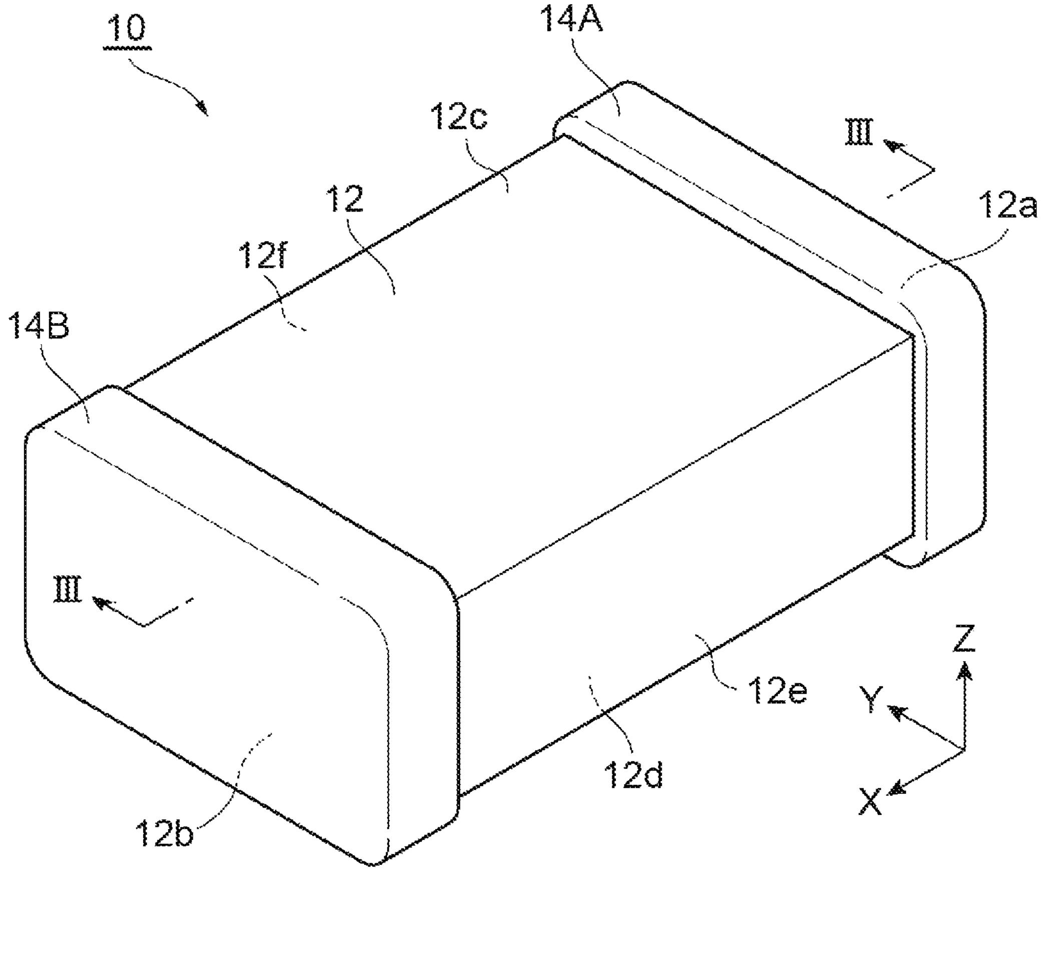
FIG. 1 is a schematic perspective view of a coil component according to an embodiment.
Figure 2:
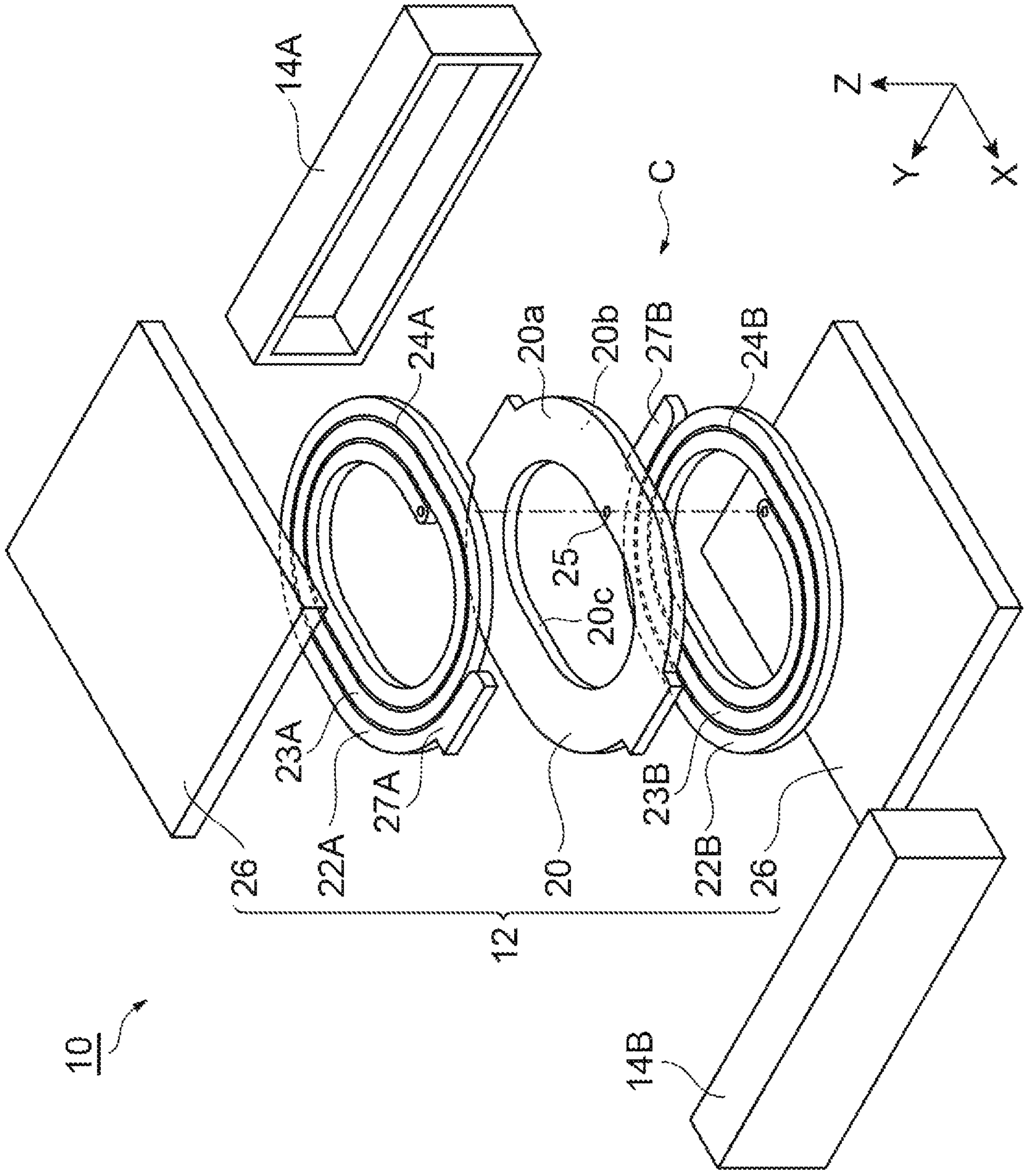
FIG. 2 is an exploded view of the coil component shown in FIG. 1.
Figure 3:
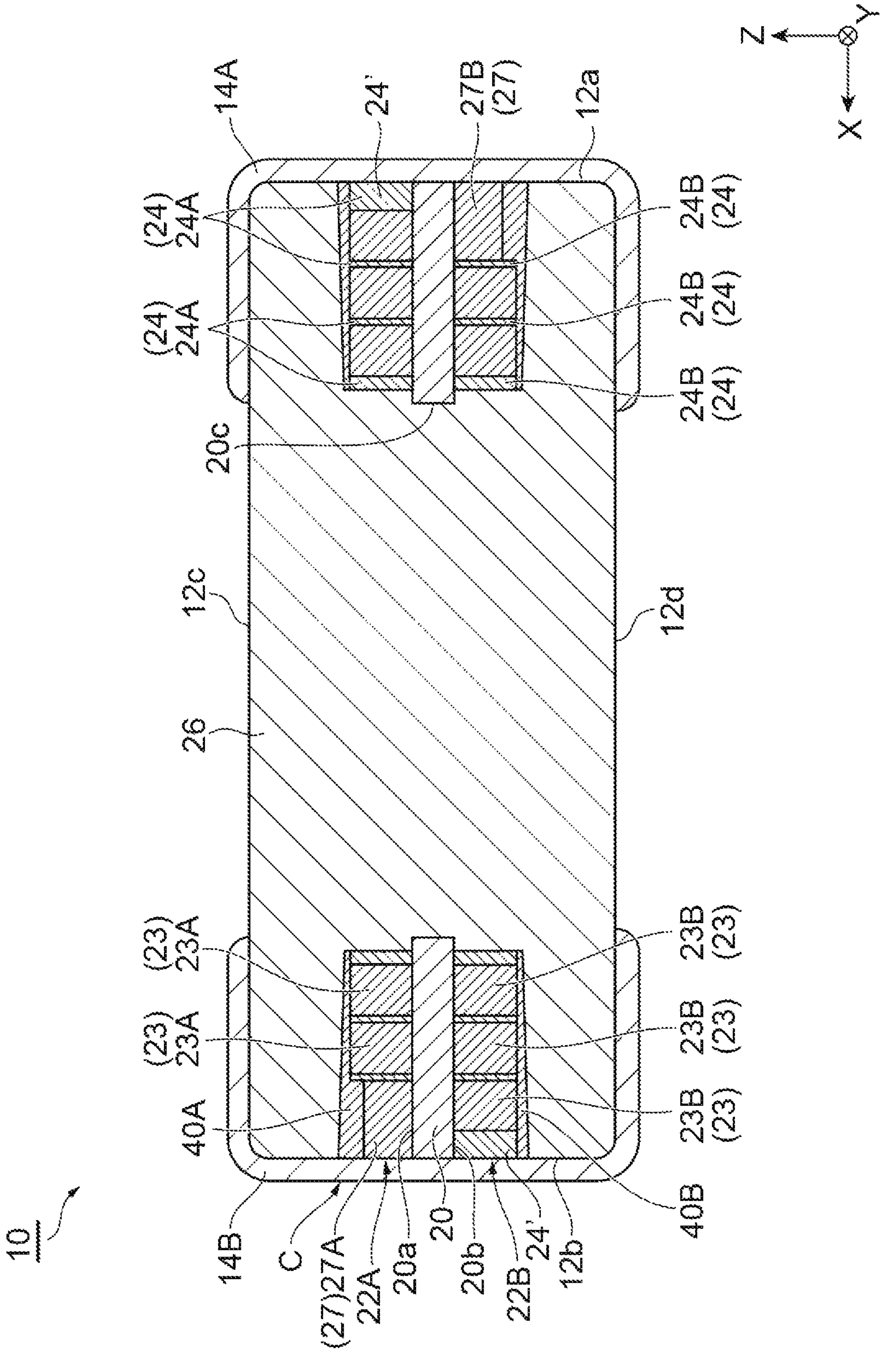
FIG. 3 is a cross-sectional view along line III-III in the coil component shown in FIG. 1.

With reference to FIGS. 1 to 3, a structure of a coil component according to the embodiment will be described. For the sake of convenience of description, an XYZ coordinate system is set as shown in the diagrams. That is, a thickness direction of the coil component is set to a Z direction, a direction in which external terminal electrodes face each other is set to an X direction, and a direction orthogonal to the Z direction and the X direction is set to a Y direction.

A coil component 10 is a flat coil element and is constituted of a base body 12 which exhibits a rectangular parallelepiped shape, and a pair of external terminal electrodes 14A and 14B which are provided on an outer surface of the base body 12. As an example, the coil component 10 is designed to have dimensions of a long side of 2.5 mm, a short side of 2.0 mm, and a height within a range of 0.8 to 1.2 mm.

The base body 12 includes a pair of end surfaces 12*a* and 12*b* which face each other in the X direction and are parallel to each other, an upper surface 12*c* and a lower surface 12*d* which face each other in the Z direction and are parallel to each other, and a pair of side surfaces 12*e* and 12*f* which face each other in the Y direction and are parallel to each other. The lower surface 12*d* of the base body 12 is a mounting surface which faces a mounting board on which the coil component 1 is mounted. The pair of external terminal electrodes 14A and 14B cover the entire surface of the pair of end surfaces 12*a* and 12*b*, and also wrap around the upper surface 12*c*, the lower surface 12*d* and the side surfaces 12*e* and 12*f* to cover a part of each of the surfaces 12*c*, 12*d*, 12*e* and 12*f*.

The base body 12 is constituted of a magnetic substance 26 and includes an insulation substrate 20 and a coil C provided on the insulation substrate 20 therein.

The insulation substrate 20 is a plate-shaped member constituted of a non-magnetic insulating material. As shown in FIG. 2, the insulation substrate 20 extends in the X direction and is parallel to the upper surface 12*c* and the lower surface 12*d* of the base body 12. The insulation substrate 20 has a substantially elliptical ring shape when seen in a thickness direction thereof, and an elliptical penetration hole 20*c* is provided in a central part of the insulation substrate 20. A substrate in which a glass cloth is impregnated with an epoxy-based resin may be used as the insulation substrate 20. In addition to an epoxy-based resin, a BT resin, a polyimide, an aramid, or the like can also be used. Regarding a material of the insulating substrate 20, ceramic or glass may also be used. Regarding a material for the insulation substrate 20, a material for mass-produced printed boards may be adopted, or for example, a resin material used for BT printed boards, FR4 printed boards, or FR5 printed boards may be adopted. A thickness of the insulation substrate 20 is, for example, 10 μm to 60 μm and may be 40 μm to 60 μm. A relative dielectric constant of the insulation substrate 20 is, for example, 5.0 or less and may be 4.0 or less, or 2.0 or less.

The coil C is configured to include a first coil 22A provided on one surface 20*a* (an upper surface in FIG. 2) of the insulation substrate 20, a second coil 22B provided on the other surface 20*b* (a lower surface in FIG. 2) of the insulation substrate 20, and a through-hole conductor 25 which passes through the insulation substrate 20 in the thickness direction at an outer edge of the penetration hole 20*c* of the insulation substrate 20.

Each of the first coil 22A and the second coil 22B has a flat coil pattern 23 having a flat spiral shape and wound around the penetration hole 20*c*, and a drawing wiring pattern 27 which draws out an outer circumferential end of the flat coil pattern 23 to the end surfaces 12*a* and 12*b* of the base body 12. Both the first coil 22A and the second coil 22B are plated coils formed by electrolytic plating using a seed pattern formed on the insulation substrate 20 and can be formed of a conductor material such as Cu.

Among the flat coil patterns 23, a first flat coil pattern 23A of the first coil 22A is wound clockwise toward the outside when seen in an upward direction (the Z direction). A connection end portion located at an inner circumferential end of the first flat coil pattern 23A is connected to the through-hole conductor 25. A height of the first flat coil pattern 23A (a length with respect to the upper surface 20*a* in the thickness direction of the insulation substrate 20) is the same over the entire length thereof.

Among the drawing wiring patterns 27, a first drawing wiring pattern 27A of the first coil 22A draws out the outer circumferential end of the first flat coil pattern 23A to the end surface 12*a* of the base body 12. The first drawing wiring pattern 27A is exposed on the end surface 12*a* of the base body 12 and is connected to the external terminal electrode 14A which covers the end surface 12*a*. A height of the first drawing wiring pattern 27A is lower than the height of the first flat coil pattern 23A.

Among the flat coil patterns 23, a second flat coil pattern 23B of the second coil 22B is wound counterclockwise toward the outside when seen in the upward direction (the Z direction). That is, the second flat coil pattern 23B is wound in a direction opposite to that of the first flat coil pattern 23A when seen in the upward direction. A connection end portion located at an inner circumferential end of the second flat coil pattern 23B is aligned with the connection end portion of the first flat coil pattern 23A in the thickness direction of the insulation substrate 20 and is connected to the through-hole conductor 25. A height of the second flat coil pattern 23B is the same over the entire length thereof and may be designed to be the same as the height of the first flat coil pattern 23A.

Among the drawing wiring patterns 27, the second drawing wiring pattern 27B of the second coil 22B draws out the outer circumferential end of the first flat coil pattern 23A to the end surface 12*b* of the base body 12. The second drawing wiring pattern 27B is exposed on the end surface 12*b* of the base body 12 and is connected to the external terminal electrode 14B which covers the end surface 12*b*. A height of the second drawing wiring pattern 27B is lower than the height of the second flat coil pattern 23B.

The through-hole conductor 25 connects the connection end portion of the first flat coil pattern 23A to the connection end portion of the second flat coil pattern 23B. The through-hole conductor 25 may be configured of a hole provided in the insulation substrate 20 and a conductive material (for example, a metal material such as Cu) filled into the hole. The through-hole conductor 25 has a substantially cylindrical or substantially prismatic outer shape which extends in the thickness direction of the insulation substrate 20. A position of the through-hole conductor 25 may be an outer edge of the penetration hole 20*c* (that is, the vicinity of the penetration hole), or may be a position away from the penetration hole 20*c* by a predetermined distance.

Further, each of the first coil 22A and the second coil 22B has a resin wall 24. Among the resin walls 24, a resin wall 24A of the first coil 22A is located between lines of the first flat coil pattern 23A and on an inner circumference and an outer circumference thereof, and a resin wall 24B of the second coil 22B is located between lines of the second flat coil pattern 23B and on an inner circumference and an outer circumference thereof.

In the embodiment, the resin walls 24 located on the inner and outer circumferences of the flat coil pattern 23 are designed to be thicker than the resin walls 24 located between the lines of the flat coil pattern 23. In particular, the outermost resin wall 24' which is located on the outer circumference of the flat coil pattern 23 and overlaps the drawing wiring pattern 27 via the insulation substrate 20 is thicker than the resin walls 24 located on the inner circumference and between the lines of the flat coil pattern 23.

The resin walls 24 are constituted of an insulating resin material. The resin walls 24 may be provided on the insulation substrate 20 before the flat coil pattern 23 is formed, and in this case, the flat coil pattern 23 is subjected to plating growth between walls defined in the resin walls 24. That is, a region for forming the flat coil pattern 23 is defined by the resin wall 24 provided on the insulation substrate 20. The resin walls 24 can be provided on the insulation substrate 20 after the flat coil pattern 23 is formed, and in this case, the resin walls 24 are provided in the flat coil pattern 23 by filling, coating, or the like.

A height of the resin wall 24 (that is, a length of the insulation substrate 20 in the thickness direction) is designed to be the same as the height of the flat coil pattern 23. The height of the resin wall 24 may also be designed to be higher than that of the flat coil pattern 23. In this case, as compared with the case in which the height of the resin wall 24 and the height of the flat coil pattern 23 are the same, a creepage distance between the flat coil patterns 23 adjacent to each other via the resin wall 24 can be extended. Thus, it is possible to curb a situation in which a short circuit occurs between the flat coil patterns 23 adjacent to each other.

The magnetic substance 26 integrally covers the insulation substrate 20 and the coil C. More specifically, the magnetic substance 26 covers the insulation substrate 20 and the coil C in an up-down direction and covers the outer circumference of the insulation substrate 20 and the coil C. In addition, the magnetic substance 26 fills the inside of the penetration hole 20*c* of the insulation substrate 20 and an inward region of the coil C.

The magnetic substance 26 is constituted of a metal magnetic powder-containing resin. The metal magnetic powder-containing resin is a binding powdery substance in which a metal magnetic powdery substance is bound with a binder resin. A dielectric constant of the magnetic substance 26 is, for example, 150.0 to 300.0 (195.0 as an example). For example, the metal magnetic powder of the metal magnetic powder-containing resin which constitutes the magnetic substance 26 may constituted of amorphous alloys such as an iron-nickel alloy (a Permalloy alloy), or carbonyl iron, a non-crystalline or crystalline FeSiCr-based alloy, Sendust, a Fe—Si-based alloy or the like. For example, the binder resin is a thermosetting epoxy resin. In the embodiment, a metal magnetic powdery substance content in the binding powdery substance may be 80 to 92 vol % in percent by volume and may be 95 to 99 wt % in percent by mass. From the viewpoint of magnetic characteristics, the metal magnetic powdery substance content in the binding powdery substance may be 85 to 92 vol % in percent by volume and may be 97 to 99 wt % in percent by mass. The magnetic powder of the metal magnetic powder-containing resin constituting the magnetic substance 26 may be a powdery substance having an average particle size of one kind or may be a powder mix having an average particle size of a plurality of kinds.

A pair of insulation layers 40A and 40B may be further provided on the base body 12, and outer surfaces of the first coil 22A and the first coil 22A may be covered by the insulation layers 40A and 40B. The first insulation layer 40A of the pair of insulation layers 40A and 40B integrally covers the outer surface (the upper end surface) of the first flat coil pattern 23A, the first drawing wiring pattern 27A, and the resin wall 24A provided on the upper surface 20*a* of the insulation substrate 20. The second insulation layer 40B of the pair of insulation layers 40A and 40B integrally covers the outer surface (the lower end surface) of the second flat coil pattern 23B, the second drawing wiring pattern 27B, and the resin wall 24B provided on the lower surface 20*b* of the insulation substrate 20.

Figure 4:
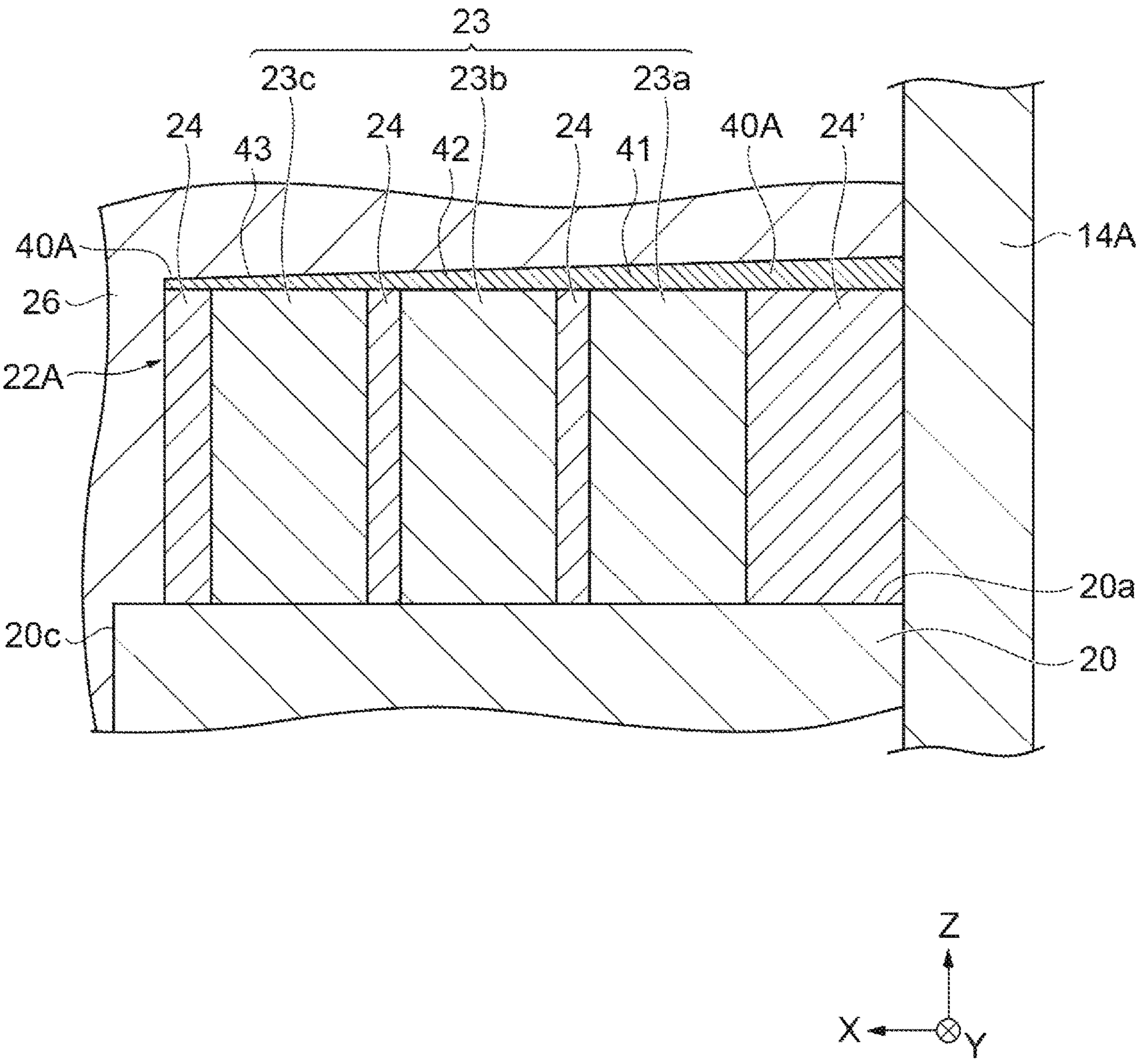
FIG. 4 is an enlarged view of a main part in the cross section shown in FIG. 3.

The insulation layers 40A and 40B are constituted of a resin such as a photoresist material and have an insulating property. The relative dielectric constant of the insulation layers 40A and 40B is, for example, 3.0 to 5.0 (3.8 as an example). A thickness of each of the insulation layers 40A and 40B gradually decreases toward the penetration hole 20*c* (that is, the coil shaft side of the coil C). As shown in FIG. 4, for example, in the first insulation layer 40A, when it is assumed that a portion which covers the outermost circumferential turn 23*a* of the flat coil pattern 23 is a first covering part 41, a portion which covers an intermediate turn 23*b* is a second covering part 42, and a portion which covers the innermost circumferential turn 23*c* is a third covering part 43, the thickness thereof gradually reduces in the order of the first covering part 41, the second covering part 42, and the third covering part 43. Further, in the first insulation layer 40A, the thickness thereof gradually decreases in the order of the resin wall 24 (the outermost resin wall 24') located on the outer circumference of the flat coil pattern 23, the resin wall 24 located between the lines of the flat coil pattern 23, and the resin wall 24 located on the inner circumference of the flat coil pattern 23. The first insulation layer 40A is the thickest in the portion thereof which covers the outermost resin wall 24'. The maximum thickness of the insulation layers 40A and 40B is, for example, 20 to 50 μm (35 μm as an example), and the minimum thickness thereof is, for example, 5 to 20 μm (10 μm as an example).

Figure 5:
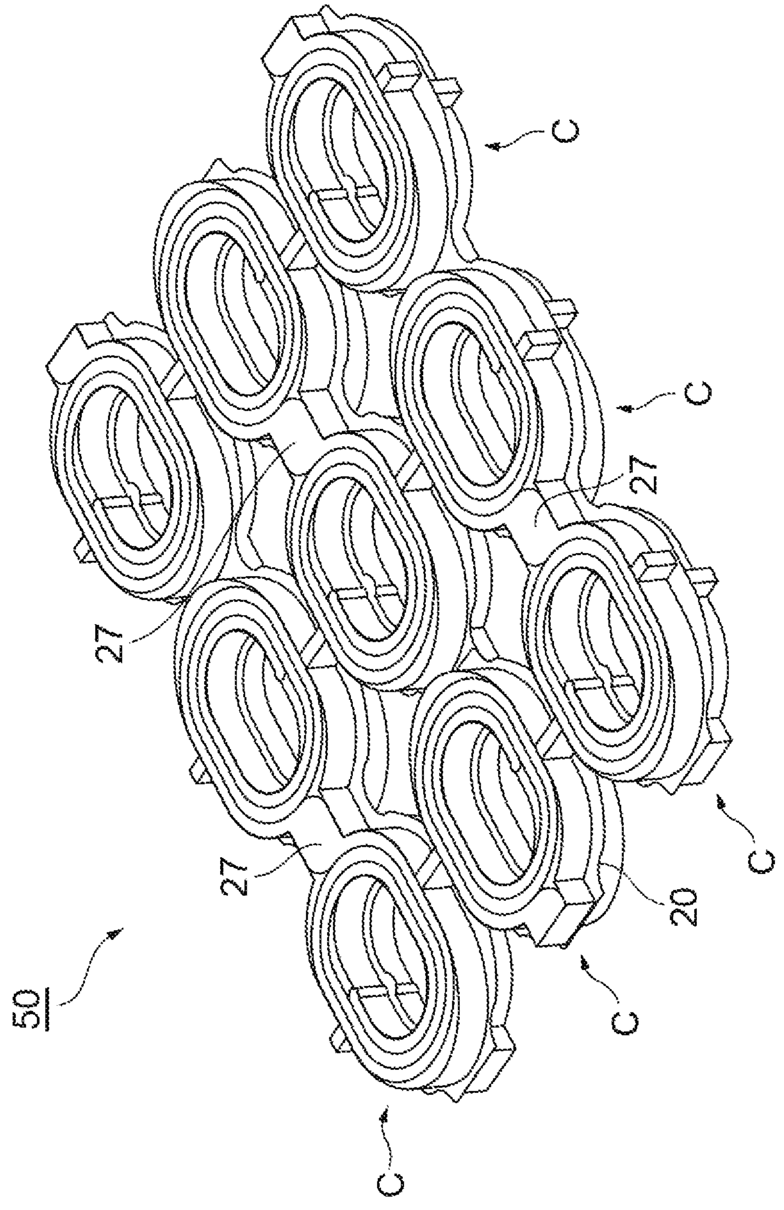
FIG. 5 is a diagram showing a part of a manufacturing process of the coil component shown in FIG. 1.
Figure 6:
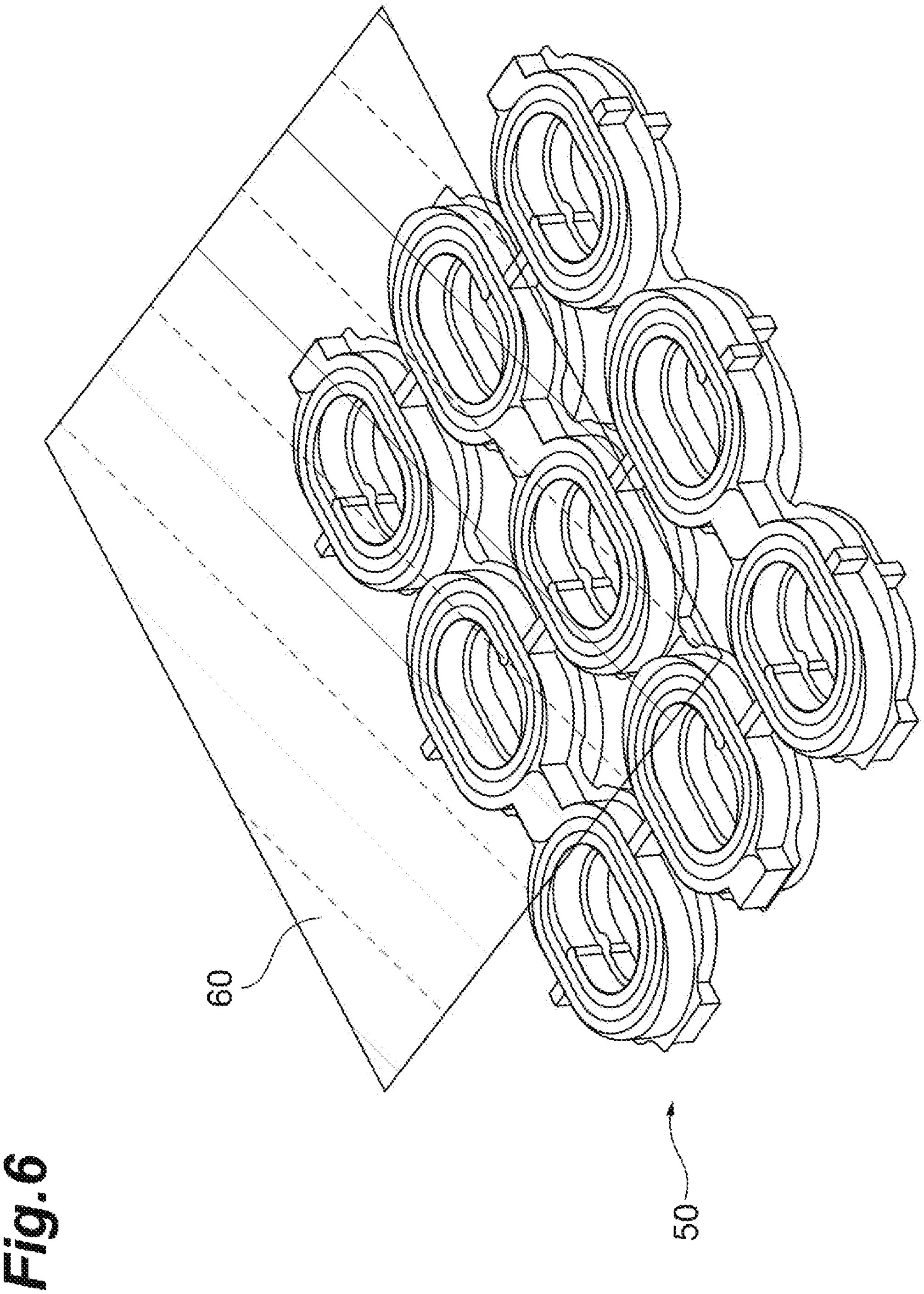
FIG. 6 is a diagram showing a part of the manufacturing process of the coil component shown in FIG. 1.
Figure 7:
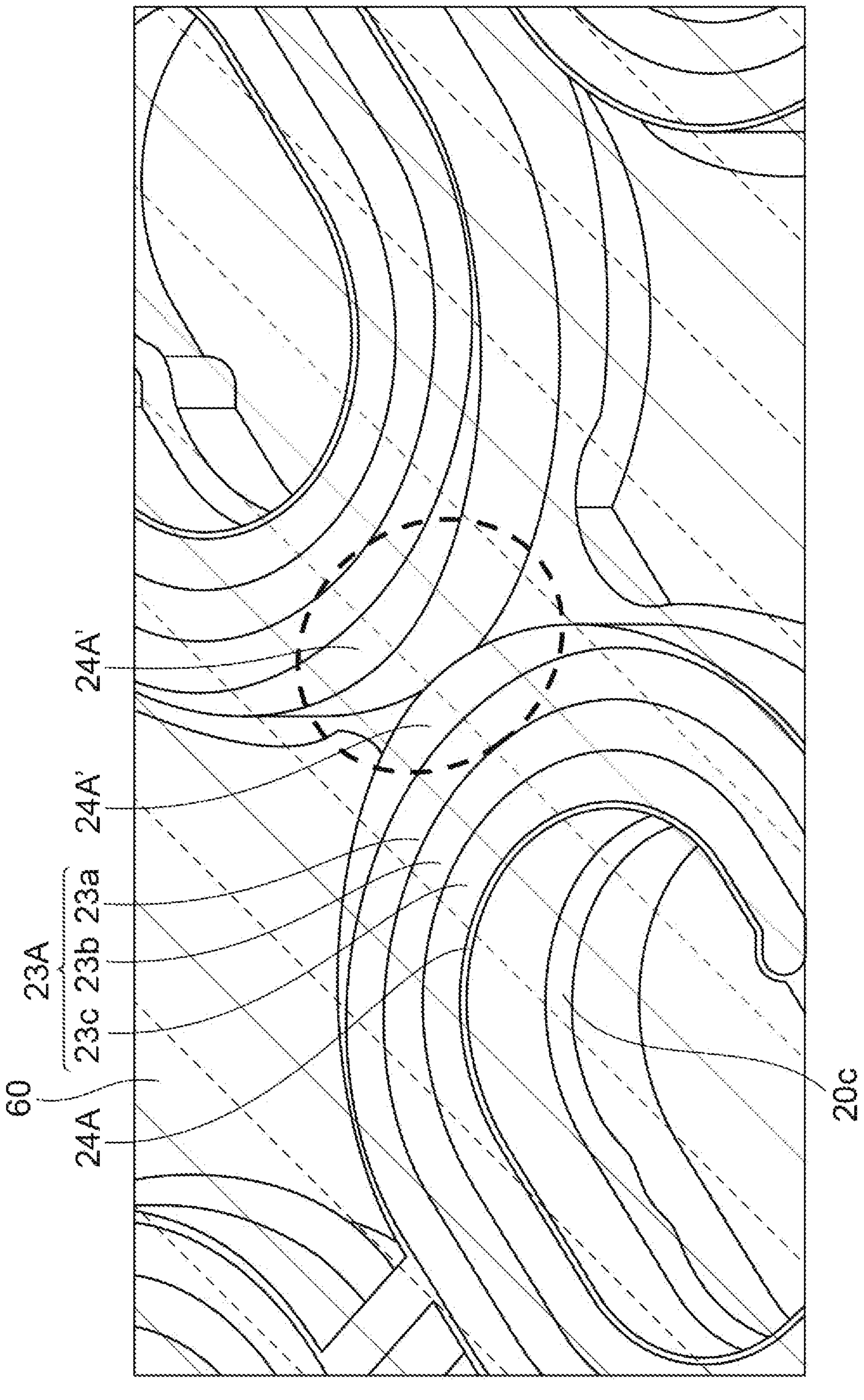
FIG. 7 is a diagram showing a part of the manufacturing process of the coil component shown in FIG. 1.

The insulation layers 40A and 40B can be formed through processes shown in FIGS. 5 to 7. That is, as shown in FIG. 5, an intermediate product 50 in which a plurality of coils C are provided on the insulation substrate 20 is manufactured, and the intermediate product 50 is cut into individual pieces in a subsequent process. In the intermediate product 50, the drawing wiring patterns 27 of the adjacent coils C are connected to each other. FIG. 6 shows a process of covering the entire intermediate product 50 with the resist film 60 to be the insulation layers 40A and 40B described above, and each of the plurality of coils C is covered with the resist film 60. Although FIG. 6 shows a situation in which the intermediate product 50 is covered with the resist film 60 from one side thereof, both sides of the intermediate product 50 are covered with the resist film 60. As shown in FIG. 7, when the coil C is covered with the resist film 60, a position and a shape of the resist film 60 are maintained in a region in which the outermost resin walls 24' of the adjacent coils C are in contact with each other (a region shown by a broken line in FIG. 7). On the other hand, the resist film 60 around the penetration hole 20*c* of the insulation substrate 20 is deformed to flow into the penetration hole 20*c*, and the resist film 60 is thinned around the penetration hole 20*c*. As a result, the insulation layers 40A and 40B which are thinner on the inner circumferential side than on the outer circumferential side of the coil C can be obtained.

As described above, in the insulation layers 40A and 40B of the coil component 10, the thickness of the second covering part 42 and the third covering part 43 (a second part) located on the penetration hole 20*c* side from the first covering part 41 is formed thinner than that of the first covering part 41 (a first part). In the coil component 10, a stray capacitance generated between the flat coil pattern 23 and the external terminal electrodes 14A and 14B is reduced by making the first covering parts 41 of the insulation layers 40A and 40B thicker than the second covering part 42 and the third covering part 43. For example, due to a potential difference between the outermost circumferential turn 23*a* of the flat coil pattern 23 shown in FIG. 4 and the external terminal electrode 14A, the stray capacitance may occur therebetween. However, since the first covering part 41 of the first insulation layer 40A interposed therebetween is thick, the stray capacitance is effectively reduced. In addition, in the coil component 10, since the second covering part 42 and the third covering part 43 of the insulation layers 40A and 40B are thinner than the first covering part 41, a magnetic volume is increased while external dimensions of the base body 12 are maintained, and thus a high inductance is realized.

In particular, since the vicinity of the innermost circumferential turn 23*c* of the flat coil pattern 23 greatly contributes to the inductance of the coil component 10, the inductance of the coil C is effectively increased by thinning the third covering part 43 and increasing the magnetic volume in the vicinity of the innermost circumferential turn 23*c*.

Further, in the coil component 10, a height of the drawing wiring pattern 27 is lower than the height of the flat coil pattern 23. Thus, the insulation layers 40A and 40B of the portion which covers the drawing wiring pattern 27 are further thickened.

Further, in the coil component 10, as shown in FIG. 3, a region of the upper surface 20*a* corresponding to a region for forming the second drawing wiring pattern 27B of the second coil 22B is covered with the outermost resin wall 24'. Similarly, a region of the lower surface 20*b* corresponding to a region for forming the first drawing wiring pattern 27A of the first coil 22A is covered with the outermost resin wall 24'. Since the outermost resin wall 24' is constituted of a material having a dielectric constant lower than that of the magnetic substance 26 constituting the base body 12, the stray capacitance occurring between the outermost circumferential turn 23*a* of the flat coil pattern 23 and the external terminal electrodes 14A and 14B is reduced. The outermost resin wall 24' may be provided separately from the other resin wall 24, or may be constituted of a material different from that of the other resin wall 24.

The present disclosure is not limited to the above-described embodiment, and may take various aspects.

For example, the thickness of the insulation layer may be other than a mode in which the thickness gradually decreases toward the penetration hole side, and may be, for example, a mode in which the thickness gradually decreases in steps. Further, it is not necessary to reduce the thickness of both of the pair of insulation layers toward the penetration hole side, and the thickness of at least one of the insulation layers may reduce toward the penetration hole side.

Figure 8:
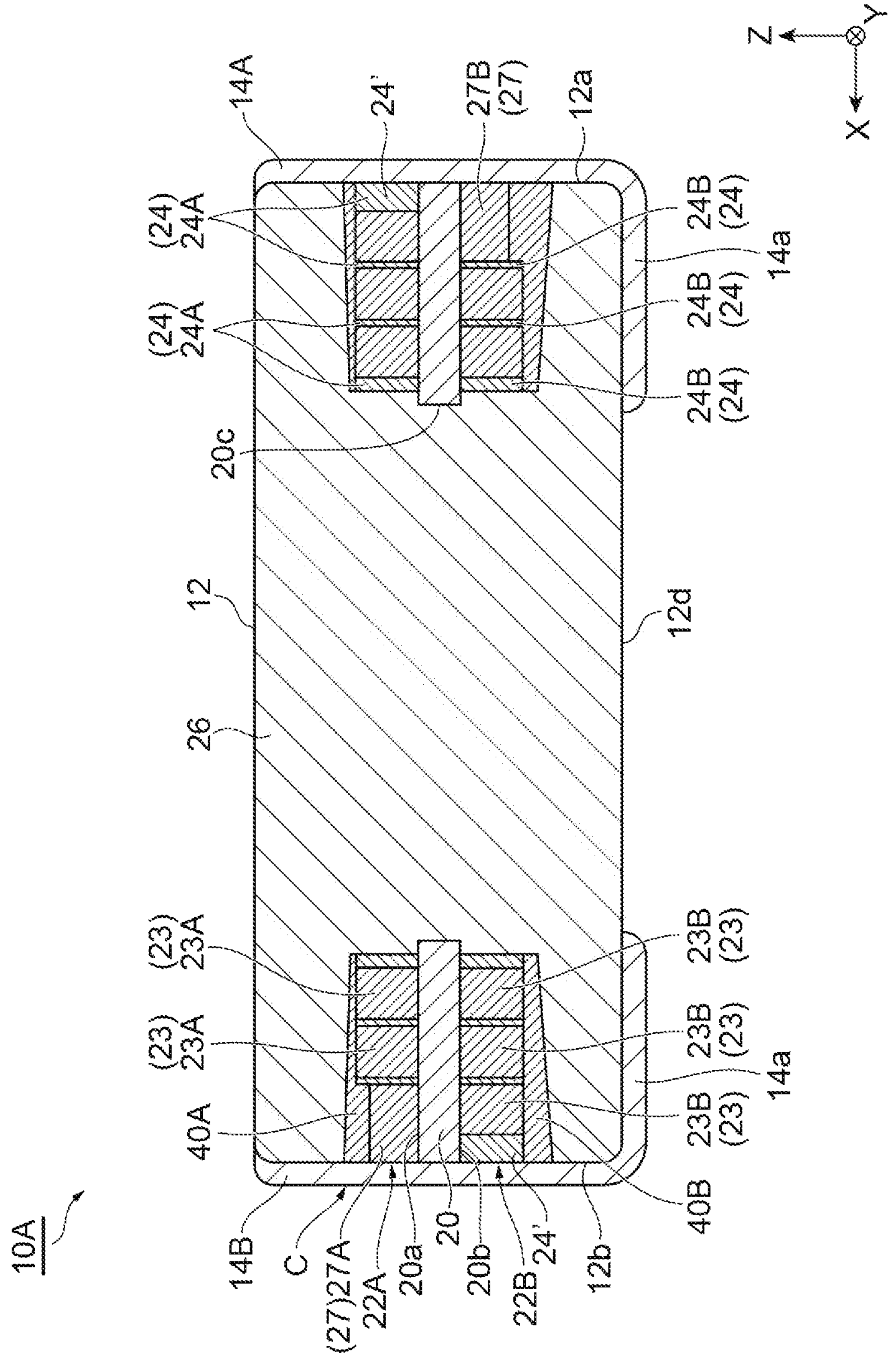
FIG. 8 is a cross-sectional view showing a coil component of a different type.

Further, the external terminal electrode may have a shape having an L-shaped cross section as shown in FIG. 8. In this case, the external terminal electrodes 14A and 14B continuously cover the end surfaces 12*a* and 12*b* and the lower surface 12*d* of the base body 12 and include a lower surface covering part 14*a* which covers the lower surface 12*d*. The lower surface covering part 14*a* faces the second flat coil pattern 23B of the second coil 22B in the thickness direction (the Z direction) of the coil component 10. Therefore, a stray capacitance may occur between the lower surface covering parts 14*a* of the external terminal electrodes 14A and 14B and the second flat coil pattern 23B due to a potential difference therebetween. As shown in FIG. 8, the stray capacitance between the lower surface covering parts 14*a* of the external terminal electrodes 14A and 14B and the second flat coil pattern 23B is reduced by making the thickness of the second insulation layer 40B which covers the second coil 22B thicker than that of the first insulation layer 40A which covers the first coil 22A.

What is claimed is:

1. A coil component comprising:

a base body constituted of a magnetic substance and having a pair of end surfaces parallel to each other;

an insulation substrate configured to extend in a facing direction of the pair of end surfaces and having a penetration hole;

a first coil including a first flat coil pattern formed around the penetration hole in one surface of the insulation substrate in the base body, first resin walls provided on the one surface of the insulation substrate and located between lines of the first flat coil pattern and on an inner circumference and an outer circumference of the first flat coil pattern, and a first drawing wiring pattern configured to draw out the first flat coil pattern to one of the pair of end surfaces;

a second coil including a second flat coil pattern formed around the penetration hole in the other surface of the insulation substrate in the base body and configured to allow conduction with respect to the first flat coil pattern of the first coil via a through-hole conductor passing through the insulation substrate, second resin walls provided on the other surface of the insulation substrate and located between lines of the second flat coil pattern and on an inner circumference and an outer circumference of the second flat coil pattern, and a second drawing wiring pattern configured to draw out the second flat coil pattern to the other of the pair of end surfaces;

a pair of insulation layers configured to cover surfaces of the first coil and the second coil in the base body respectively; and a pair of external terminal electrodes configured to cover the pair of end surfaces and respectively connected to the first drawing wiring pattern of the first coil and the second drawing wiring pattern of the second coil, wherein at least one of the insulation layers has a first part and a second part located closer to the penetration hole than the first part is, and a thickness of the second part is thinner than that of the first part, and the thickness of the at least one insulation layer gradually decreases toward the penetration hole side.

2. The coil component according to claim 1, wherein a height of the first drawing wiring pattern is lower than a height of the first flat coil pattern with respect to the one surface of the substrate.

3. The coil component according to claim 1, wherein a region of the one surface of the insulation substrate corresponding to a region for forming the second drawing wiring pattern of the second coil formed on the other surface of the insulation substrate is covered with a material having a relative dielectric constant lower than that of the magnetic substance constituting the base body.

4. The coil component according to claim 1, wherein the base body has a mounting surface parallel to the insulation substrate and located on the other surface side of the insulation substrate, the external terminal electrodes continuously cover the end surfaces and the mounting surface of the base body, and the thickness of the insulation layer covering the second coil is thicker than that of the insulation layer covering the first coil.

* * * * *